(12) United States Patent
Kojima et al.

(10) Patent No.: US 7,608,954 B2
(45) Date of Patent: Oct. 27, 2009

(54) ELECTRIC MOTOR

(75) Inventors: Tomonori Kojima, Kawasaki (JP);
Hirokazu Matsuzaki, Kawasaki (JP);
Masaki Yamada, Kawasaki (JP)

(73) Assignee: Fujitsu General Limited, Kawasaki-shi, Kanagawa (JP)

( * ) Notice: Subject to any disclaimer, the term of this patent is extended or adjusted under 35 U.S.C. 154(b) by 568 days.

(21) Appl. No.: 11/475,161

(22) Filed: Jun. 27, 2006

(65) Prior Publication Data
US 2007/0001534 A1    Jan. 4, 2007

(30) Foreign Application Priority Data
Jun. 30, 2005    (JP) .............................. 2005-193033

(51) Int. Cl.
*H02K 5/00*    (2006.01)
(52) U.S. Cl. .......................................... 310/89; 310/45
(58) Field of Classification Search ................... 310/43, 310/45, 71, 89, 194
See application file for complete search history.

(56) References Cited

U.S. PATENT DOCUMENTS

| | | | | |
|---|---|---|---|---|
| 4,794,285 A | * | 12/1988 | Nimura et al. ............ | 310/68 D |
| 5,406,154 A | * | 4/1995 | Kawaguchi et al. ........ | 310/67 R |
| 6,169,344 B1 | * | 1/2001 | Tsuruhara ................... | 310/58 |
| 6,617,716 B2 | * | 9/2003 | Ishida ......................... | 310/58 |
| 6,633,098 B2 | * | 10/2003 | Inaba et al. ................. | 310/58 |
| 6,674,188 B2 | * | 1/2004 | Yockey et al. .............. | 310/52 |
| 6,680,552 B2 | * | 1/2004 | Linden et al. ............... | 310/62 |
| 6,740,995 B2 | * | 5/2004 | Oohashi et al. ........... | 310/68 D |
| 6,900,566 B2 | * | 5/2005 | Misaki ........................ | 310/89 |
| 7,339,296 B2 | * | 3/2008 | Kondo et al. ............. | 310/68 D |
| 7,482,719 B2 | * | 1/2009 | Itoh ............................ | 310/64 |

* cited by examiner

*Primary Examiner*—Thanh-Tam T Le
(74) *Attorney, Agent, or Firm*—Manabu Kanesaka

(57) ABSTRACT

A gap surface (225) on which a circuit board (5) for driving control is mounted is provided between a first inner surface (222) and a second inner surface (223), a tip end of a terminal pin (6) is projected in a part of the gap surface (225), and further a first concave portion (228) formed by recessing surroundings of the terminal pin (6) in an axis line direction of the terminal pin is provided in the gap surface (225). Thus, an electric motor can be assembled in a short period of time.

7 Claims, 11 Drawing Sheets

ELECTRIC MOTOR

TECHNICAL FIELD

The present invention relates to an electric motor having a stator embedded in a synthetic resin compact and a rotor arranged so as to face to the teeth surface of the stator. More particularly, it relates to an electric motor that requires less manpower for parts and is capable of being assembled easily in a short period of time.

BACKGROUND ART

As shown, for example, in Patent Document 1 (Japanese Patent Application Publication No. H05-292697), an electric motor has a stator arranged in a bracket and a rotor arranged so as to face to the teeth surface of the stator. The electric motors come in a radial gap type such as an inner rotor type in which the rotor is rotatably arranged in the center of the stator and an outer rotor type in which the rotor is arranged on the outer periphery side of the stator, and an axial air-gap type in which the disc-shaped rotor is arranged along the axis line so as to face to the side surface of the similarly disc-shaped stator.

The rotor and the stator are laid out in a cylindrical metallic bracket, and a circuit board etc. mounted with a driving circuit are further installed. In the electric motor described in Patent Document 1, an insulating sheet is inserted between the circuit board and the bracket to provide insulation of the circuit board.

However, only the insertion of the insulating sheet described in Patent Document 1 between the circuit board and the bracket cannot completely insulate the circuit board from the bracket. That is to say, in the case of Patent Document 1, since the insulation distance between the bracket and the terminal of the circuit board is short, there is a fear of generating a short circuit between the terminal and the bracket when a high load is applied to the motor.

Also, Patent Document 2 (Japanese Patent Application Publication No. 2000-078804) has disclosed a technique in which when the stator is integrally molded together with a synthetic resin, a part of a pin of the stator is inserted in a guide hole provided in a mold so that the relative positioning between the mold and the stator can be performed easily.

However, the technique described in Patent Document 2 has a drawback in that if the initial positions are inconsistent with each other, the mold and the terminal pin come into contact with each other, so that the mold cannot be closed smoothly. Also, if an attempt is made to forcedly fit the terminal pin, the terminal pin may be damaged.

SUMMARY OF THE INVENTION

The present invention has been made to solve the above-mentioned problems, and accordingly an object thereof is to provide an electric motor that requires reduced manpower for assembling a stator and is capable of being assembled with high accuracy in a shorter period of time.

To achieve the above object, the present invention has several features described below. In an electric motor having a stator embedded in a synthetic resin compact and a rotor arranged so as to face to the teeth surface of the stator, the stator includes a stator iron core and an insulator for insulating the winding section of the stator iron core, and a pair of terminal pins to which the start end and the termination end of a coil wound on the winding section are connected are erected on the insulator; and the synthetic resin compact includes a first inner peripheral surface on the inside and a second inner peripheral surface on the outside, which have different inside diameters, a height difference surface on which a circuit board for driving control is mounted is provided between the first inner peripheral surface and the second inner peripheral surface, the tip end of the terminal pin is projected in a part of the height difference surface, and a first concave portion formed by recessing the surroundings of the terminal pin in the axis line direction of the terminal pin is provided in the height difference surface.

According to this configuration, since in a part of the inner peripheral surface of the synthetic resin compact, the terminal pin of the stator is erected on the height difference surface on which the circuit board is mounted, the terminal pin can be connected directly to the circuit board merely by mounting the circuit board on the height difference surface. Also, since the first concave portion is provided around the terminal pin, the circuit board can be installed horizontally along a first height difference surface.

The second inner peripheral surface preferably has a second concave portion formed by recessing a portion adjacent to the terminal pin in the radial direction of the stator.

According to this configuration, since the second concave portion is provided on the side surface side of the terminal pin, a wide insulation space can be provided between the terminal pin and the inner peripheral surface, so that a short circuit etc. can be prevented.

The width in the circumferential direction of the first concave portion is preferably the same as the width in the circumferential direction of the second concave portion.

According to this configuration, since the first and second concave portions have the same diameter, a mold for insert molding can be designed more easily.

The width in the circumferential direction of the second concave portion is preferably greater than the width in the circumferential direction of the first concave portion.

According to this configuration, since the diameter of the second concave portion is preferably larger than the diameter of the first concave portion, a wide insulation space can be provided, so that the danger of short circuit can further be reduced.

A lid member is preferably installed at both ends of the synthetic resin compact, and the width of the second concave portion depends on the distance between the lid member and the terminal pin.

According to this configuration, since the diameter of the second concave portion is determined by depending on the distance between a bracket and the terminal pin, an electric motor in which a short circuit is less liable to occur even if the distance between the bracket and the terminal pin is designed so as to be short can be provided.

A convex portion rising so as to surround the terminal pin is provided integrally on the bottom surface of the first concave portion when the synthetic resin compact is insert molded, and the first concave portion preferably has a depth such that at least the tip end of the convex portion is lower than the height difference surface.

According to this configuration, since the convex portion formed in the root portion of the terminal pin at the time of insert molding is surely accommodated in the first concave portion, the circuit board can be installed more horizontally along the first height difference surface.

The stator is provided with an insulating sheet for covering the circuit board, and the insulating sheet is preferably provided with a locking claw fitted in the second concave portion.

According to this configuration, since the locking claw fitted in the second concave portion is provided in a part of the insulating sheet, the insulating sheet can be installed surely on the stator without the use of an adhesive etc.

BRIEF DESCRIPTION OF THE DRAWINGS

FIGS. 14A to 14D are explanatory views for illustrating a step of connecting core members.

DETAILED DESCRIPTION

Figure 1:
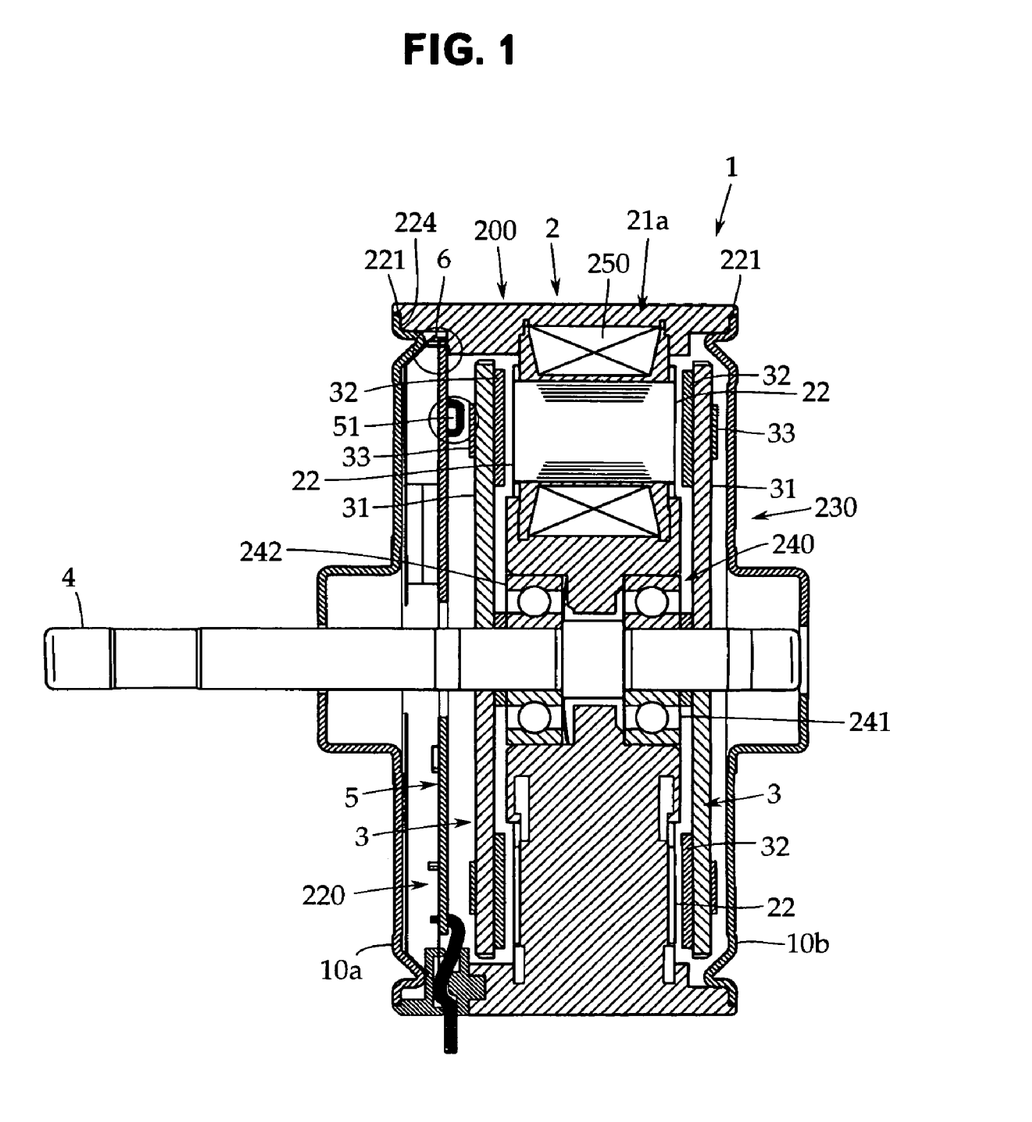
FIG. 1 is a sectional view of an essential portion of an axial air-gap electric motor in accordance with one embodiment of the present invention.
Figure 2A:
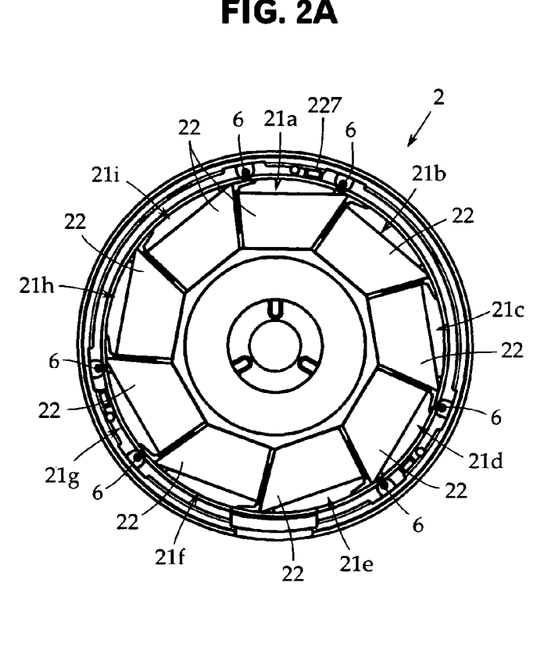
FIG. 2A is a front view of a stator of the axial air-gap electric motor.
Figure 2B:
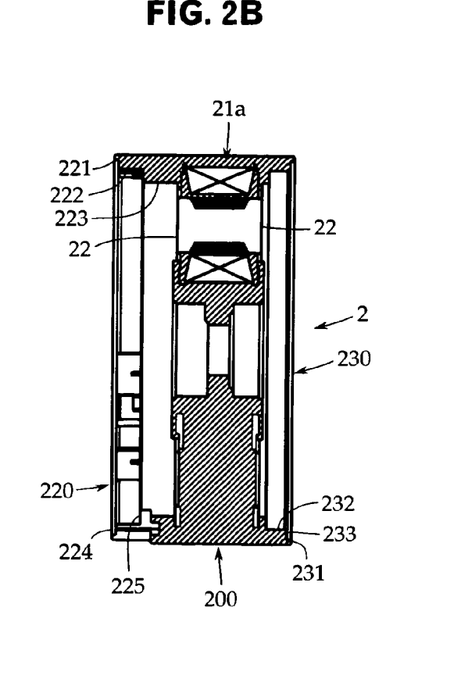
FIG. 2B is a side view of the stator.
Figure 3:
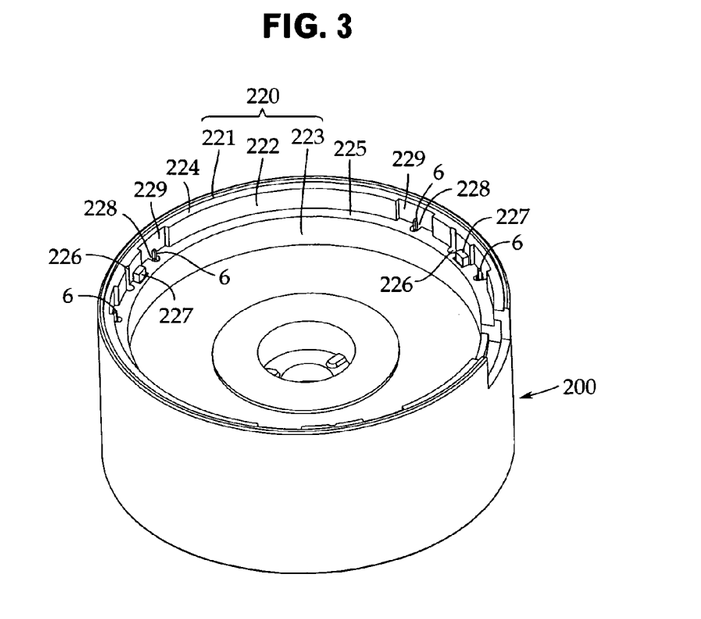
FIG. 3 is a perspective view of a stator of the axial air-gap electric motor.

An embodiment of the present invention will now be described with reference to the accompanying drawings. The present invention is not limited to this embodiment. FIG. 1 is a sectional view of an essential portion of an axial air-gap electric motor in accordance with one embodiment of the present invention. FIGS. 2A and 2B are front and side views of a stator, respectively, and FIG. 3 is a perspective view of the stator.

This axial air-gap electric motor 1 has a stator 2 embedded in a resin compact 200 and a pair of rotors 3 arranged so as to face to both side surfaces of the stator 2 in the axial direction with a predetermined air gap being provided. The rotors 3 are fixed coaxially on a rotor output shaft 4 for delivering a rotational driving force.

The stator 2 is formed in a ring shape with the axis line of the rotor output shaft 4 being the center, and is integrally molded together with the resin compact 200 by insert molding. At both ends of the resin compact 200, lid members 10a and 10b are installed to close both ends of the resin compact 200.

At both ends of the resin compact 200, there are provided first and second storing sections 220 and 230 for storing various motor mechanism portions including the rotors 3.

The first storing section 220 (the left-hand side in FIG. 1) consists of a concave portion recessed along the axis line direction of the rotor output shaft 4, and on the bottom surface of the concave portion, teeth surfaces 22 on one side of core members 21a to 21i of the stator 2 are exposed. In FIG. 3, the teeth surfaces 22 are omitted for the configuration of drawing.

As shown in FIG. 3, the first storing section 220 is formed into a step shape having three inner peripheral surfaces (a first inner peripheral surface 221, a second inner peripheral surface 222, and a third inner peripheral surface 223) whose inside diameters decrease stepwise from the outside toward the inside.

Between the first inner peripheral surface 221 and the second inner peripheral surface 222, a first height difference surface 224 that is horizontal along the teeth surface 22 is provided. As shown in FIG. 1, the first height difference surface 224 is a support surface for supporting the outer peripheral edge of the lid member 10a, and the lid member 10a is attached horizontally along the first height difference surface 224 together with the first inner peripheral surface 221.

Between the second inner peripheral surface 222 and the third inner peripheral surface 223, a similarly horizontal second height difference surface 225 is provided. The second height difference surface 225 is a support surface for supporting a circuit board 5 for driving the motor, and is formed one step lower than the first height difference surface 224.

Figure 4:
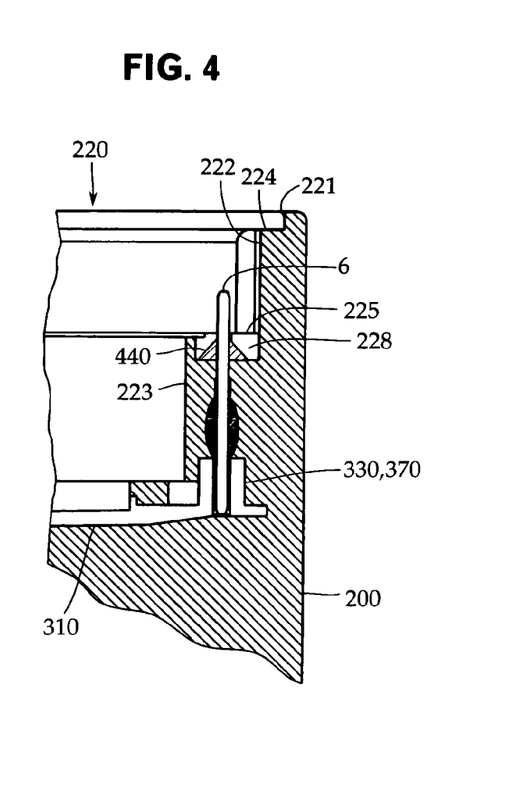
FIG. 4 is a sectional view of an essential portion of a stator, enlargedly showing a portion near a terminal pin.

As shown in a partially enlarged view of FIG. 4, on the second height difference surface 225, the tip end portions of terminal pins 6 provided on the stator 2 are projectingly provided. The terminal pins 6 are erected substantially perpendicularly from flange portions 310 of the core members 21a to 21i of the stator 2, and to a part thereof, the start end and the termination end of a coil 250 are connected in an entangled state respectively.

The terminal pins 6 are provided in a set of two at three places (a total of six places) for each phase (U phase, V phase, and W phase) of the electric motor. In this example, the terminal pins 6 are erected from the core members 21a, 21d and 21g respectively.

According to this configuration, as shown in FIG. 1, by mounting the circuit board 5 along the second height difference surface 225, the terminal pins 6 can be inserted directly in insertion holes, not shown, provided in the circuit board 5.

As a more preferred mode, it is preferable that first concave portions 228 recessed one step lower from the second height difference surface be provided around the terminal pins 6 on the second height difference surface 225. According to this configuration, a portion formed into a convex shape by a synthetic resin entering into a portion around the terminal pin 6 at the time of insert molding because of insufficient seal between the mold and the terminal pin 6 can be accommodated in the first concave portion 228, so that the circuit board 5 can surely be mounted horizontally.

More favorably, it is preferable that second concave portions 229 formed by recessing a part of the second inner peripheral surface 222, which is adjacent to the terminal pin 6, in the radial direction is provided. According to this configuration, a short circuit from the tip end of the terminal pin 6 toward the lid member 10a can be prevented.

It is preferable in terms of mold design that the first concave portion 228 and the second concave portion 229 have the same width in the radial direction. However, in order to prevent a short circuit reliably, it is far preferable that the second concave portion 229 have a larger diameter (width) than the first concave portion 228.

That is to say, since an annular convex portion provided at the outer periphery of the lid member 10a shown in FIG. 1 is close to the tip end of the terminal pin 6, a locking claw for an insulating sheet is preferably extended in the circumferential direction. The diameter of this second concave portion depends on the distance between the lid member 10a and the terminal pin 6 (discharge distance). In this example, the distance between the lid member 10a and the terminal pin 6 is set at 2 mm to withstand 1800 V.

On the upper surface (the left-hand side in FIG. 1) of the circuit board 5, the insulating sheet, not shown, is installed, and at the outer periphery of the insulating sheet, the plurality of locking claws, not shown, are provided. By fitting the locking claws in the second concave portions 229, the insulating sheet is held along the circuit board 5.

Figure 5:
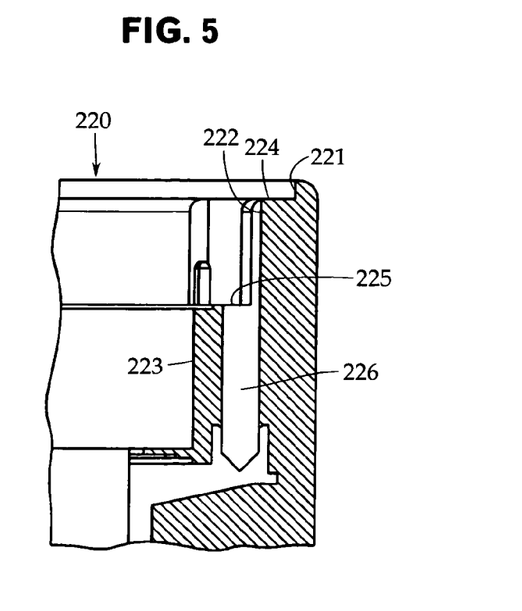
FIG. 5 is a sectional view of an essential portion of a stator, enlargedly showing a portion near a guide hole.

The second height difference surface 225 is further formed with guide holes 226. As shown in FIG. 5, the guide hole 226 is formed by inserting a guide pin, not shown, in a guide hole 361 in a positioning portion 360 provided on the core member 21a, 21d, 21g when the stator 2 is insert molded.

On the second height difference surface 225, locking claws 227 are provided which coincide with notch portions, not shown, provided in the circuit board 5 and are used to position the circuit board 5 with respect to the stator 2. The locking claw 227 is provided so as to project toward the inside, and, in this example, is provided at three places at a predetermined angle.

The second storing section 230 (the right-hand side in FIG. 1) consists of a concave portion recessed along the axis line direction of the rotor output shaft 4, and on the bottom surface of the concave portion, teeth surfaces 22 on the other side of core members 21a to 21i of the stator 2 are exposed.

The second storing section 230 is formed into a step shape having two inner peripheral surfaces (a first inner peripheral surface 231 and a second inner peripheral surface 232) whose inside diameters decrease stepwise from the outside toward the inside.

Between the first inner peripheral surface 231 and the second inner peripheral surface 232, a first height difference surface 233 that is horizontal along the teeth surface 22 is provided. As shown in FIG. 1, the first height difference surface 233 is a support surface for supporting the outer peripheral edge of the other lid member 10b, and the lid member 10b is attached horizontally along the first height difference surface 233 together with the first inner peripheral surface 231.

In the central portion of the stator 2 is arranged a bearing section 240. In this example, the bearing section 240 has a pair of radial ball bearings 241 and 242, the inner race thereof being press fitted in the rotor output shaft 4, and the outer race side being embedded in the resin compact 200. In the present invention, the configuration of the bearing section 240 may be arbitrary.

In each of the first and second storing sections 220 and 230, a disc-shaped rotor 3 is arranged so as to be rotatable. The rotor 3 is provided with a rotor magnet 32 on the surface facing to the stator 2 of a disc-shaped rotor back yoke 31. On the surface opposite to the surface facing to the opposite stator 2 (on the circuit board 5 side) of a disc-shaped rotor back yoke 31, a position detecting magnet 33 is provided which serves as a detected portion of a position detecting sensor 51 mounted on the circuit board 5.

In the present invention, the rotor 3 may have an arbitrary shape if it has a basic configuration for an axial air-gap electric motor. In this example, the rotors 3 are arranged on both right and left sides of the stator 2; however, the rotor may be arranged only on one side.

Further, although the rotors 3 has the same rotor output shaft 4 in common, a two-output shaft type may be used in which each of the rotors 3 has a respective rotor output shaft. Also, a shaft-less type may be used in which the rotors 3 are directly supported on the stator 2 via a radial ball bearing without the use of the rotor output shaft 4.

Figure 6:
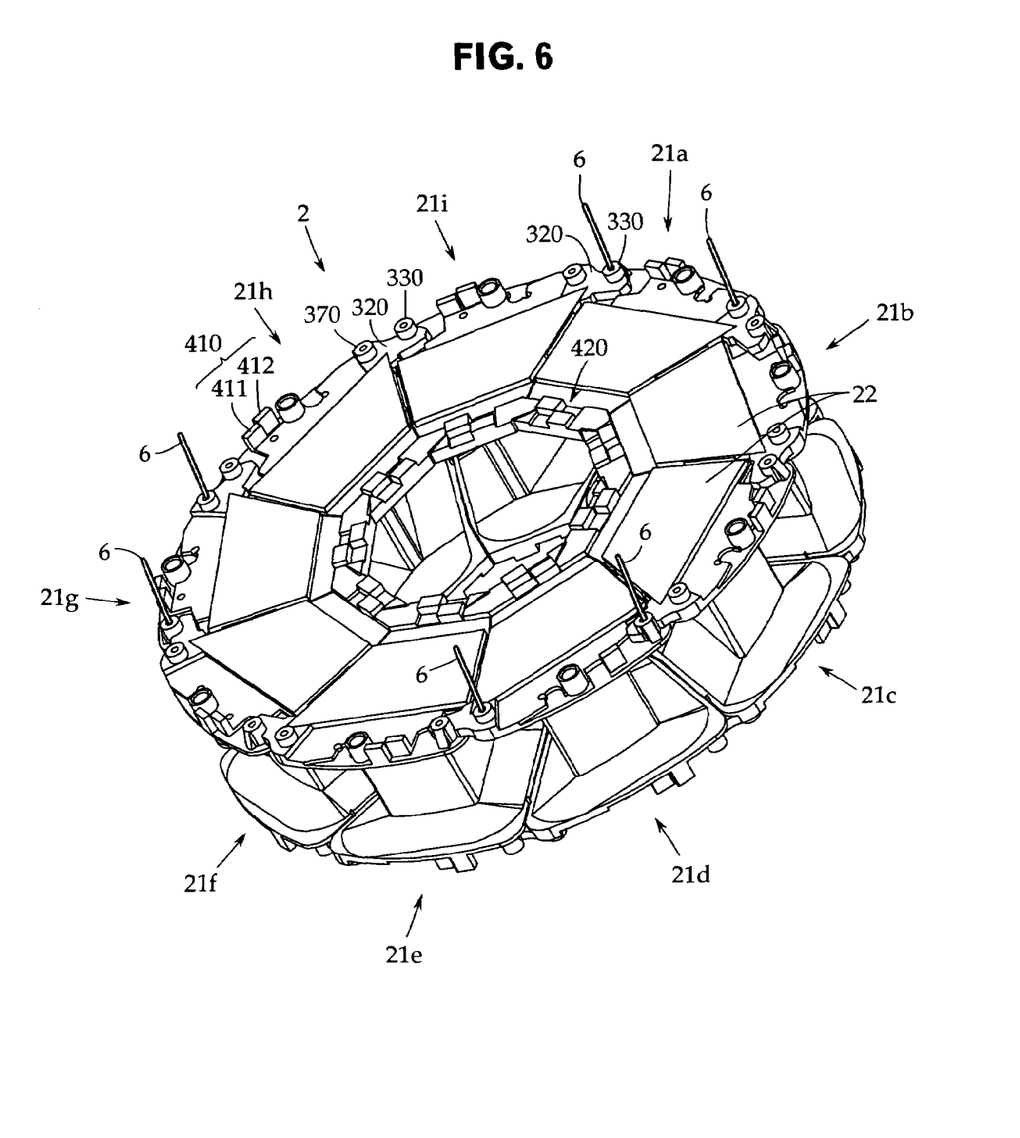
FIG. 6 is a perspective view of a stator core.
Figure 7A:
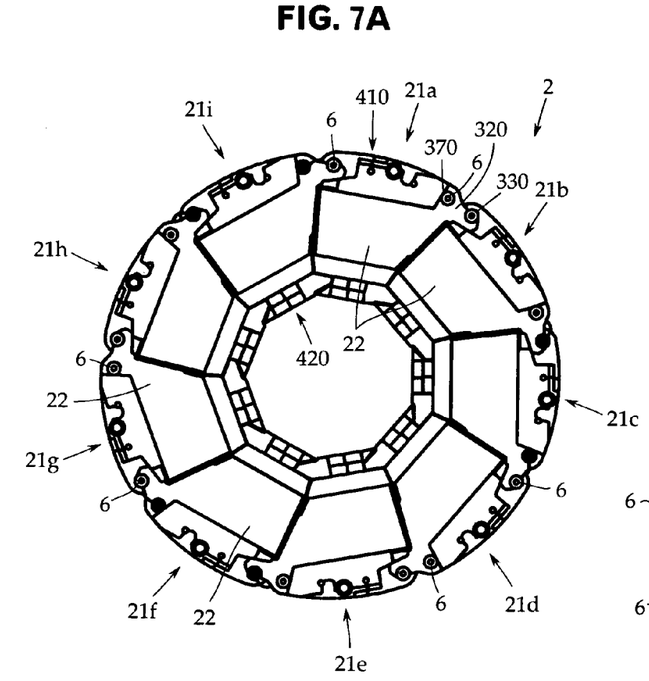
FIG. 7A is a front view of the stator core.
Figure 7B:
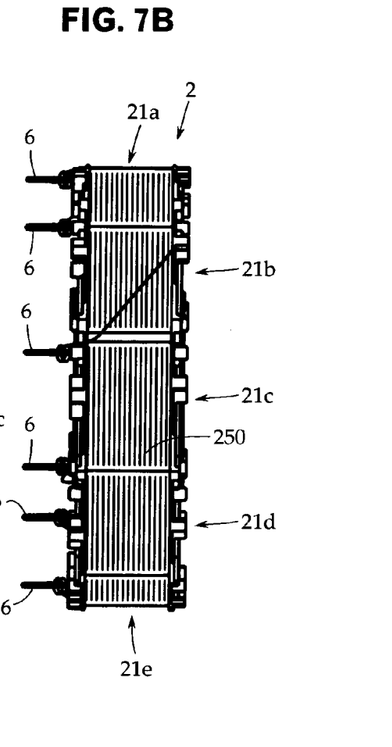
FIG. 7B is a side view of the satator core.
Figure 8A:
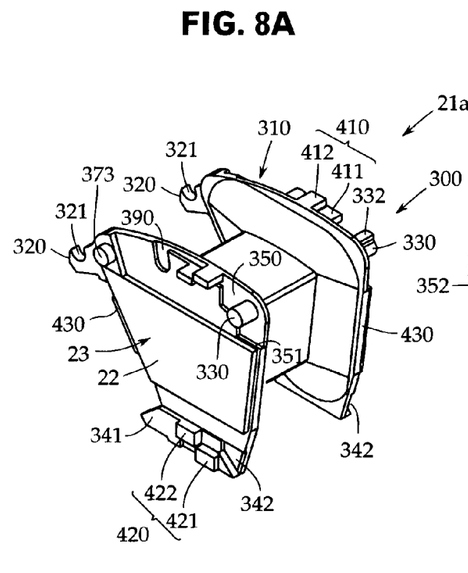
FIG. 8A is a perspective view of a core member, viewed from one flange portion side.
Figure 8B:
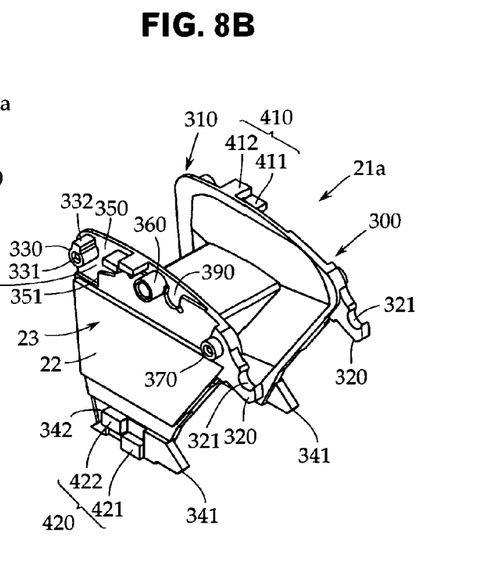
FIG. 8B is a perspective view of the core member, viewed from the other flange portion side.
Figure 9A:
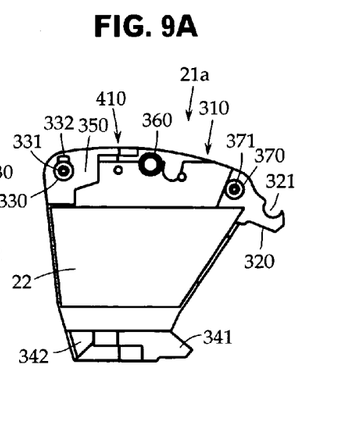
FIG. 9A is a front view of a core member.
Figure 9B:
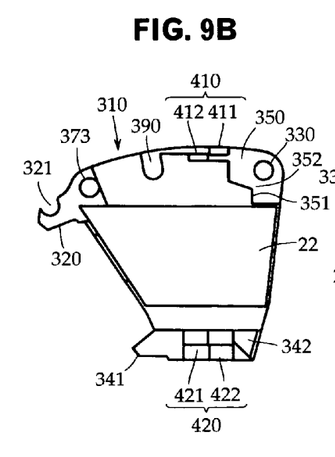
FIG. 9B is a back view of member.
Figure 9C:
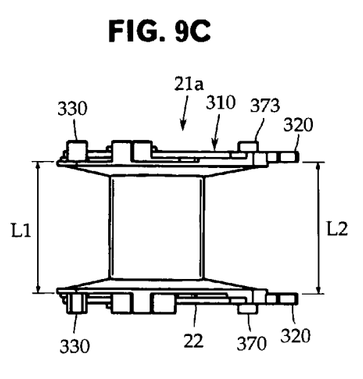
FIG. 9C is a plan view of the core member.
Figure 9D:
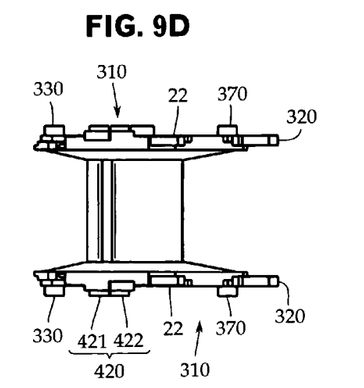
FIG. 9D is a bottom view of the core member.
Figure 9E:
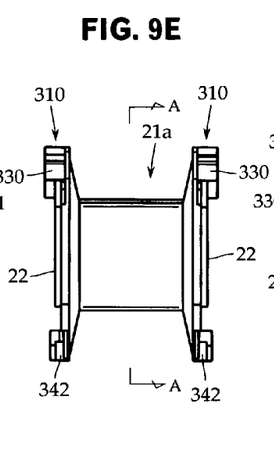
FIG. 9E is a side view of the core member.
Figure 9F:
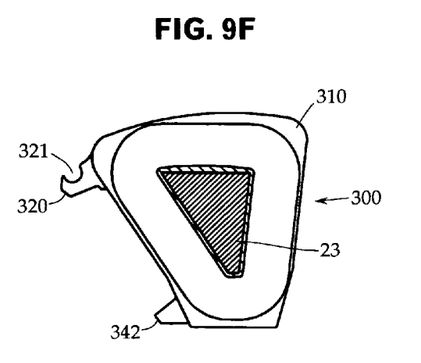
FIG. 9F is a sectional view taken along the line A-A of core member.

Next, the stator 2 is explained. FIG. 6 is a perspective view of the stator 2, and FIGS. 7A and 7B are front and side views of a stator core, respectively. FIGS. 8A and 8B are perspective views of a core member, FIG. 9A is a front view of the core member, FIG. 9B is a back view of the core member, FIG. 9C is a plan view of the core member, FIG. 9D is a bottom view of the core member, FIG. 9E is a side view of the core member, and FIG. 9F is a sectional view taken along the line A-A.

As shown in these figures, the stator 2 includes the plurality of (in this example, nine (nine-slot)) core members 21a to 21i arranged in a ring form with the rotation axis line of the rotor output shaft 4 being the center axis. Since the core members 21a to 21i have the same construction, in this example, the core member 21a is explained as an example.

As shown in FIGS. 8A and 8B, the core member 21a has a bobbin-shaped stator iron core 23 having a pair of right and left flange-shaped teeth surfaces 22, and the coil 250 (refer to FIG. 1) is wound on the stator iron core 23. The stator iron core 23 is formed by laminating H-shaped magnetic steel sheets in the radial direction.

In this example, at both ends of the teeth surface 22 of the stator iron core 23, a skew tilted at a predetermined angle is formed in the circumferential direction to reduce cogging torque. The shape of the teeth surface 22, including the presence of the skew, is selected arbitrarily according to the motor specification.

The whole of the stator iron core 23 excluding the teeth surfaces 22 is covered by an insulator 300 consisting of an insulating resin. The insulator 300 has the flange portions 310 extending in the radial direction along the teeth surfaces 22. These flange portions 310 also form a part of the bobbin on which the coil 250 is wound.

Each of the flange portions 310 is provided with two connecting means for connecting the core members 21a to 21i to each other. First, as a first connecting means, in the end portions in the circumferential direction of the flange portions 310, there are provided hook portions 320 for connecting the core members 21a to 21i to each other in a ring form with the rotor output shaft 4 being the center and locking shafts 330 to which the hook portions 320 are locked.

Figure 10A:
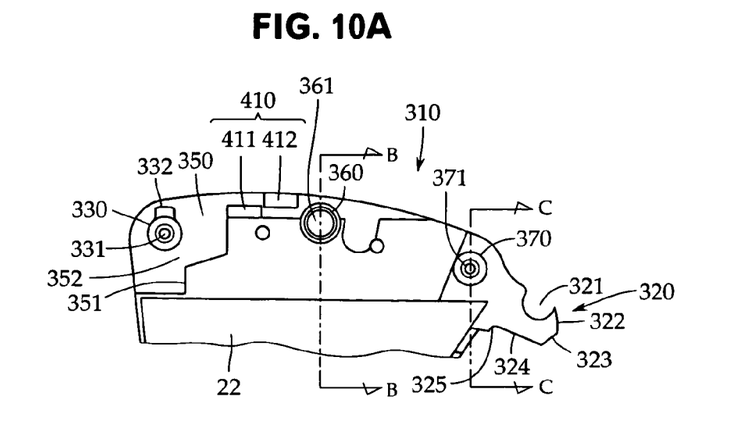
FIG. 10A is an enlarged side view showing the outer periphery side of one flange portion of a core member.
Figure 10B:
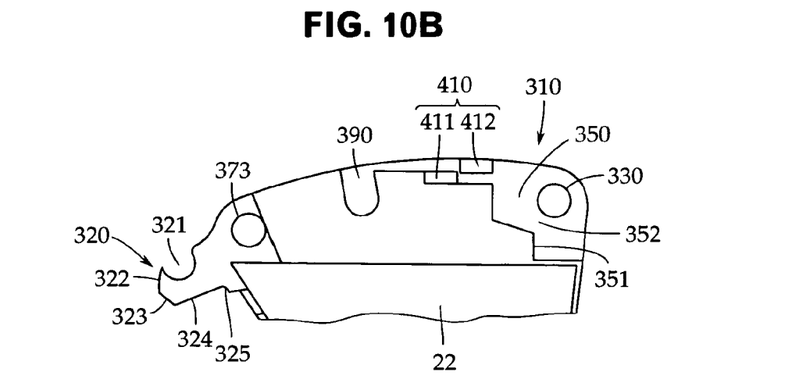
FIG. 10B is an enlarged side view showing the outer periphery side of the other flange portion of a core member.

Referring additionally to partially enlarged views of FIGS. 10A and 10B, the hook portion 320 is a convex portion provided so as to project from one end portion in the circumferential direction (the right end in FIG. 10A) toward the outside on the outer periphery side of the flange portion 310, and on the upper end face of the hook portion 320, there is provided a hook groove 321 locked along the locking shaft 330.

The hook groove 321 consists of an arcuate groove locked along the outer peripheral surface of the locking shaft 330. By locking the hook groove 321 to the locking shaft 330 of the adjacent core member 21a to 21i, the core members 21a to 21i are turnably connected to each other with the locking shaft 330 being the center.

The hook portion 320 is provided with first to third guide surfaces 322 to 324 for locking the hook portion 320 to the locking shaft 330 smoothly. The first guide surface 322 consists of a taper surface formed slantwise right downward (refer to FIG. 10A) from the edge of the hook groove 321 toward the tip end.

The second guide surface 323 consists of a taper surface formed slantwise left downward (refer to FIG. 10A) from the tip end of the first guide surface 322 toward the flange portion 310 side, and the third guide member 324 consists of a taper surface formed slantwise left upward (refer to FIG. 10A) from the end portion of the second guide surface 323 toward the proximal end of the flange portion 310.

In the root portion between the third guide surface 324 and the flange portion 310, there is provided a rounded portion 325 which comes into contact along a guide portion 350 when both ends of the core members 21a to 21i are finally connected after the core members 21a to 21i have been connected to each other.

The locking shaft 330 is provided so as to project to the other end side in the circumferential direction on the outer periphery side of the flange portion 310 (the end portion on the side opposite to the hook portion 320), and is integrally formed on the flange portion 310 in a columnar form. In this example, the locking shafts 330 are provided coaxially with the flange portion 310 being held therebetween.

Of the locking shafts 330, one (the front side in FIG. 8B) of the locking shafts 330 is provided with a support hole 331 with a predetermined depth along the axial direction. The support hole 331 consists of an insertion hole for erecting the terminal pin 6, and the terminal pin 6 is erected substantially perpendicularly in the support hole 331.

One of the locking shafts 330 is provided with a reinforcing rib 332 for compensating the strength of the flange portion 310 including the locking shaft 330 lowered by decreased thickness of the guide portion 350. In this example, the reinforcing rib 332 is provided at a position not subjected to an intervention by the hook portion 7, namely, on the upper surface side of the locking shaft 330. The other of the locking shafts 330 consists of a simple columnar body.

Although the reinforcing rib 332 is provided on only one of the locking shafts 330, it is a matter of course that the reinforcing rib 332 may be provided on both of the locking shafts 330. Also, the shape and the number of the reinforcing ribs 332 can be changed arbitrarily if the position thereof does not interfere with the locking position of the hook portion 320.

As a preferable mode, as shown in FIG. 9C, the surface-to-surface distance L2 between the inner surfaces of the hook portions 320 is made shorter than the surface-to-surface distance L1 between the guide portions 350 of the flange portions 310.

According to this configuration, by installing the hook portions 320 on the flange portions 310, the hook portions 320 can be fixed more firmly by supporting the flange portions 310 held therebetween.

Figure 12A:
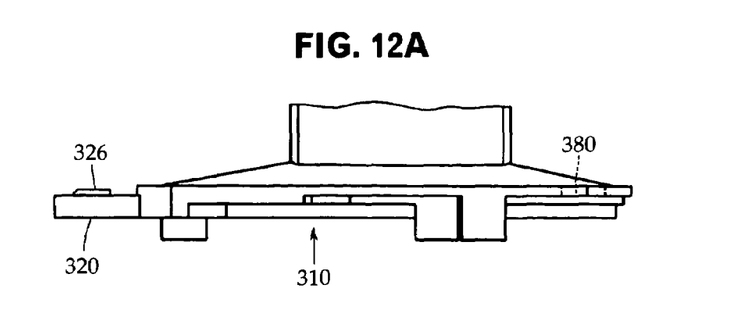
FIG. 12A is a partially enlarged front view showing a modification of a first connecting means.
Figure 12B:
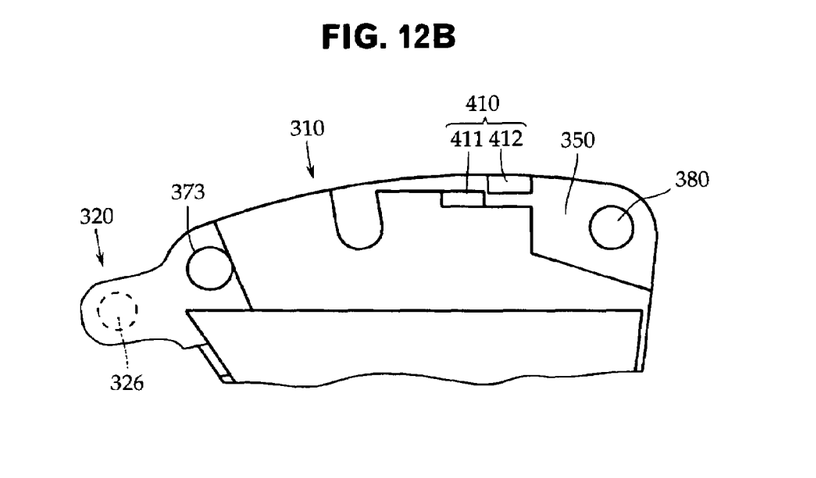
FIG. 12B is a partially enlarged plan view showing a modification of a first connecting means.

In this example, the first connecting means connects the core members 21a to 21i to each other by locking the hook groove 321 of the hook portion 320 to the locking shaft 330. Besides, as shown in FIGS. 12A and 12B, the configuration may be such that a convex portion 326 is provided on the inside in the axial direction of the hook portion 320, and a concave portion 380 is provided in the guide portion 350 of the flange portion 310, by which the convex portion 326 is fitted in the concave portion 380. Although the convex portion 326 and the concave portion 380 are formed into a round shape, these portions may have a polygonal shape.

The flange portion 310 is provided with a locking convex portion 341 serving as a second connecting means and a locking concave portion 342 for receiving the locking convex portion 341. The locking convex portion 341 is a convex portion provided so as to project to the outside from one end portion (the right-hand side surface in FIG. 9A) in the circumferential direction of the flange portion 310, and, in this example, consists of a tongue element formed into a triangular shape.

On the other hand, the locking concave portion 342 consists of a notch portion formed so as to be directed toward the inside from the other end portion (the left-hand side surface in FIG. 9A) in the circumferential direction of the flange portion 310, and is formed as a triangular shape coinciding with the locking convex 341.

In this example, the locking convex portion 341 and the locking concave portion 342 are formed into a triangular shape. However, the shape thereof can be changed arbitrary according to the motor specification such as a square or semi-circle shape if the shape is such as to be capable of connecting the core members 21a to 21i to each other in a ring form.

According to this configuration, by engaging the locking convex portion 341 and the locking concave portion 342 with each other together with the first connecting means, the pole members 21a to 21i can be connected to each other in a ring form surely with high accuracy.

As shown in FIGS. 10A and 10B, the flange portion 310 is further provided with the guide portion 350 for guiding the hook portion 320 to the locking shaft 330.

The guide portion 350 consists of a concave portion formed by recessing a part of the flange portion 310 in the axis line direction of the rotor output shaft 4. In a boundary portion between the guide portion 350 and the flange portion 310, a height difference surface 351 is provided to guide the hook portion 320 and also to hold a part of the hook portion 320 together with the locking shaft 330.

A part of the height difference surface 351 is formed into a step shape, and a holding portion 352 is formed to support the hook portion 320 by holding it between the locking shaft 330 and the height difference surface 351. According to this configuration, the height difference surface 351 comes into contact with a part of the hook portion 320, by which the hook portion 320 can be fixed firmly by being held together with the locking shaft 330.

Figure 11A:
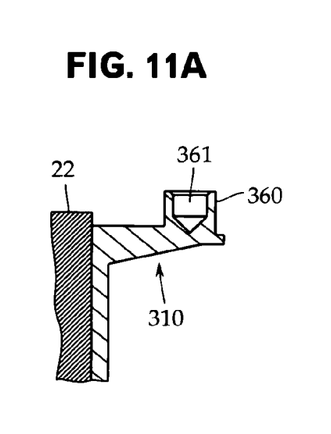
FIG. 11A is a sectional view taken along the line B-B of FIG. 10A.
Figure 11B:
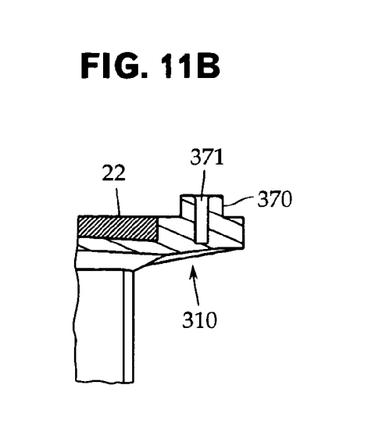
FIG. 11B is a sectional view taken along the line C-C of FIG. 10A.

As shown in FIGS. 10A and 11B, the flange portion 310 is provided with a positioning portion 360 for providing relative positioning between the mold and the core members 21a to 21i when the resin compact 200 is integrally molded by insert molding after the core members 21a to 21i have been connected in a ring form.

The positioning portion 360 consists of a cylindrical boss projectingly provided in a substantially central portion at the upper end of one flange portion 310, and in the center thereof is provided a guide hole 361 into which a guide pin, not shown, is inserted. The bottom portion of the guide hole 361 is formed into a conical shape to facilitate the introduction of the guide pin.

In the flange portion 310 on the front side shown in FIG. 11A, a cylindrical portion 370 in which the other terminal pin 6 is erected is further provided. The cylindrical portion 370 is provided with a support hole 371 for erecting the terminal pin 6 so that the terminal pin 6 is erected substantially perpendicularly via the support hole 371.

The flange portion 310 on the front side shown in FIG. 11B is also provided with a cylindrical portion 373 having the same shape as that of the cylindrical portion 370. However, the cylindrical portion 373 consists simply of a columnar body, and is projectingly provided coaxially with the cylindrical portion 370 with the flange portions 310 being held therebetween. The cylindrical portion 370 is provided on a concentric circle with the center axis of the rotor output shaft 4 being the center.

The flange portion 310 further has a first positioning portion 410 and a second positioning portion 420 as positioning means for arranging the core members 21a to 21i along a predetermined horizontal rotating shaft with the teeth surfaces 22 of the flange portions 310 facing to each other.

The first positioning portion 410 has a pair of positioning ribs 411 and 412 provided on the outer periphery side of the flange 310, and each of the positioning ribs 411 and 412 consists of a rectangular plate body provided so as to project perpendicularly from the flange portion 310. The positioning ribs 411 and 412 are arranged in a state of being shifted relatively in the circumferential direction and the radial direction of the stator 2 on the flange portion 310.

The second positioning portion 420 has a pair of positioning ribs 421 and 422 provided on the inner periphery side of the flange portion 310, and each of the positioning ribs 421 and 422 consists of a rectangular plate body provided so as to project perpendicularly from the flange portion 310. The positioning ribs 421 and 422 are also arranged in a state of being shifted relatively in the circumferential direction and the radial direction of the stator 2 on the flange portion 310.

Figure 13:
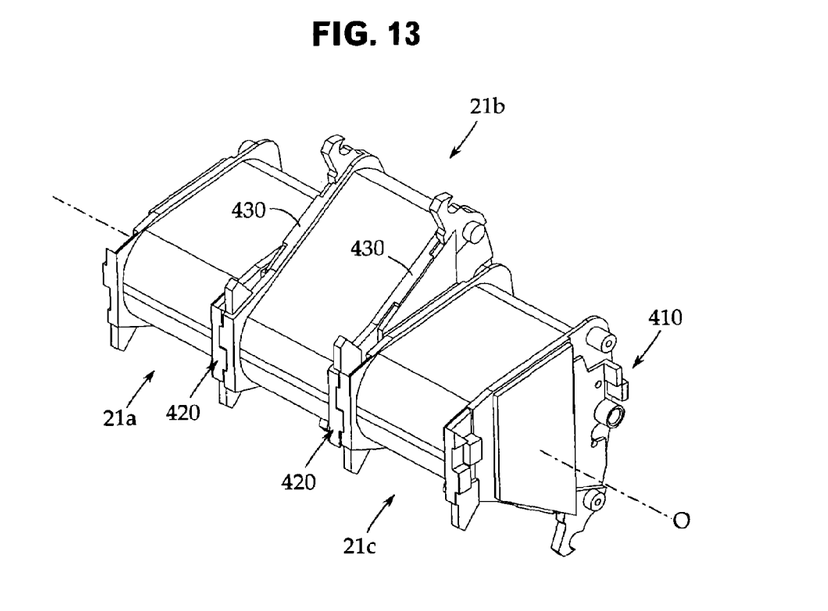
FIG. 13 is a perspective view showing a state in which core members are arranged in a rod form.

According to this configuration, by engaging the positioning ribs 411 and 412 with each other with the teeth surfaces 22 of the adjacent core members (for example, 21a and 21b) facing to each other, as shown in FIG. 13, the core members 21a to 21c (21d to 21f, 21g to 21i) are arranged for each phase along the horizontal rotating shaft O, and thus the coil 250 can be wound on the core members 21a to 21c in one turn without being cut.

On the upper end side of the flange portion 310, receiving portions 390 are provided which receive the tip ends of the locking shaft 330 and the positioning portion 360 when the teeth surfaces of the core members 21a to 21i are caused to butt together as shown in FIG. 13.

The receiving portion 390 consists of a concave portion formed into a U shape on the upper end side of the flange portion 310, and the tip ends of the locking shaft 330 and the positioning portion 360 are locked to the receiving portions 390. In this example, the receiving portion 390 consists of the concave portion; however, the receiving portion 390 may be a boss or the like.

As shown in FIG. 13, on one end side in the circumferential direction of the flange portion 310, there is provided a winding protective portion 430 for covering the side surface of the teeth surface 22 of the stator iron core 23 from which the flange portion 301 projects.

The winding protective portion 430 consists of a rib erected along the side surface of the teeth surface 22 so that the side surface of the teeth surface 22 is covered by the rib. According to this configuration, as shown in FIG. 13, a jumper wire set between the core members 21a to 21i can be prevented from being broken or damaged by a direct contact with the stator iron core 23 when the coil 250 is wound in one turn.

Figure 14A:
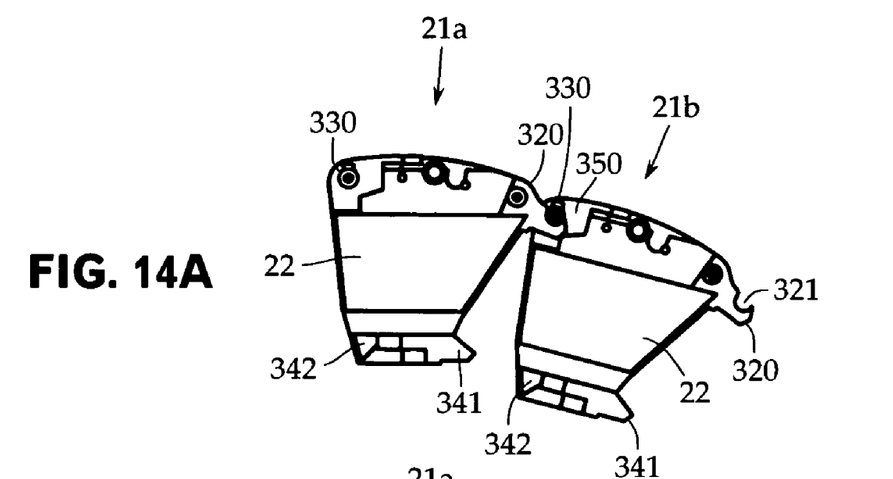

Next, one example of a connecting procedure for the core members 21a to 21i is explained with reference to FIGS. 14A to 14C and 15A to 15D. First, as shown in FIG. 14A, the hook groove 321 in the hook portion 320 of the core member 21a is hooked to the locking shaft 330 of the adjacent core member 21b.

Figure 14B:
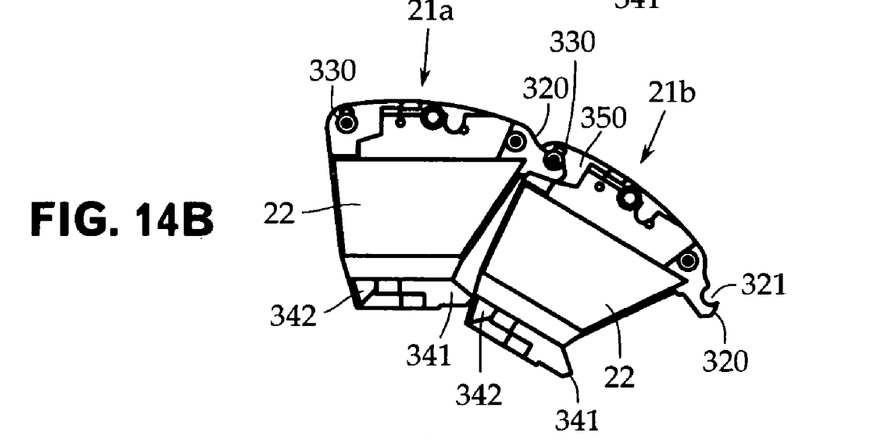

Then, as shown in FIG. 14B, the core member 21b is turned to the core member 21a side around the locking shaft 330 in the state in which the hook portion 320 is hooked to the locking shaft 330. Therefore, the tip end portion of the hook portion 320 passes through the holding portion 352 formed between the locking shaft 330 and the height difference surface 351 while being turned.

Figure 14C:
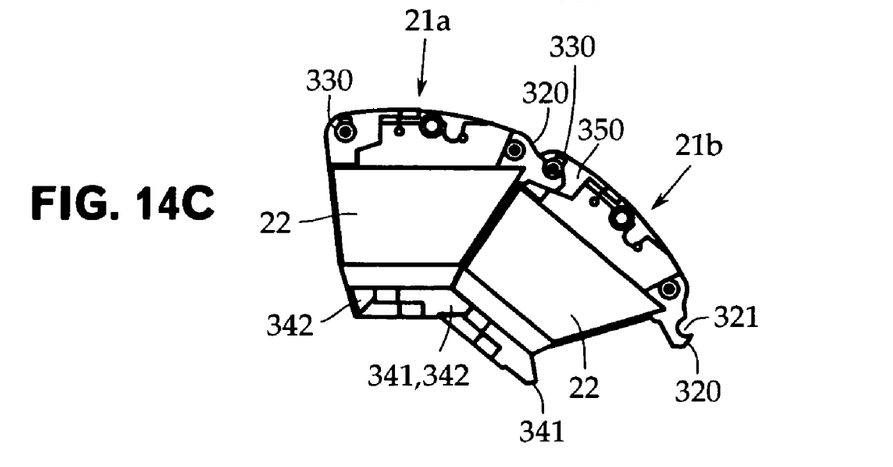

When the core member 21b is further turned to the core member 12a side, as shown in FIG. 14C, the locking concave portion 342 of the core member 21b is inserted toward the locking convex portion 341 of the core member 21a, which is the second connecting means, by which the core member 21a and the core member 21b are connected to each other. At this time, the holding portion 352 acts as a stopper to restrain the tip end of the hook portion 320, by which the movement of the core member 21a in the arrow-marked direction is regulated.

Figure 15A:
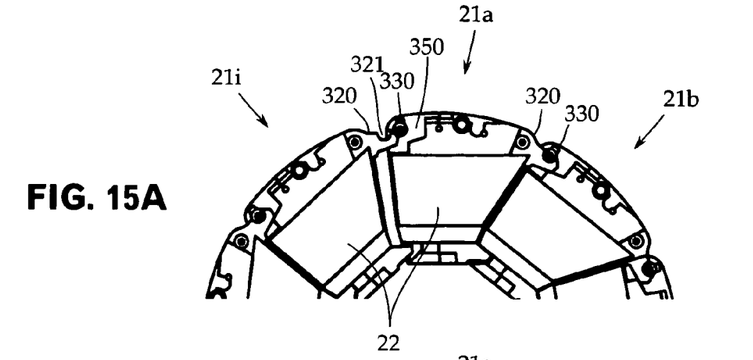
FIGS. 15A to 15D are explanatory views for illustrating a step of connecting core members.

A series of operations described above are repeated for each of the core member 21a to 21i. Finally, the end portion of the core member 21a is connected to the end portion of the core member 21i. As shown in FIG. 15A, the tip end portion of the hook portion 320 of the core member 21i is brought into contact with the locking shaft 330 of the core member 21a.

Figure 15B:
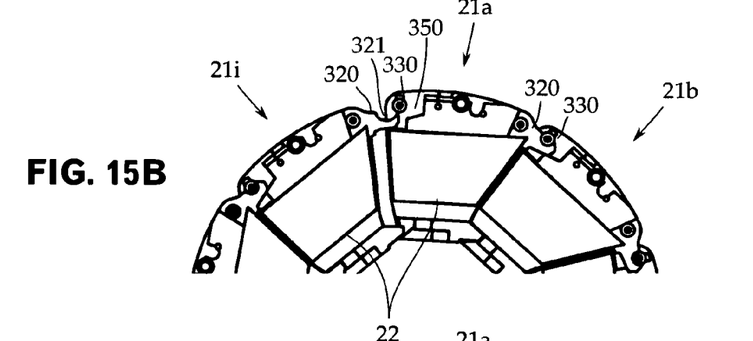

When the hook portion 320 is pushed into the locking shaft 330 side in the state in which the hook portion 320 is in contact, as shown in FIG. 15B, the hook portion 320 is pushed into the lower side of the locking shaft 330 along the first guide surface 322 (refer to FIG. 10A).

Figure 15C:
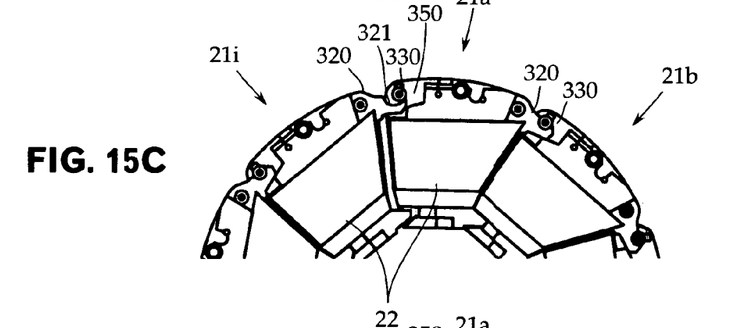

When the hook portion 320 is further pushed in, as shown in FIG. 15C, the second guide surface 323 of the hook portion 320 comes into contact with the height difference surface 351, and a part of the third guide surface 324 comes into contact with a corner portion of the teeth surface 22, so that the hook portion 320 passes through a narrow portion between the locking shaft 330 and the holding portion 351 while being deformed elastically.

Figure 15D:
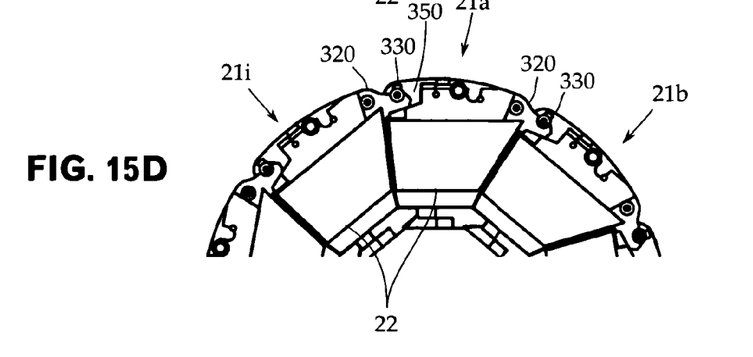

Then, when the hook portion 320 is further pushed in, as shown in FIG. 15D, the hook portion 320 is pushed in while the rounded portion 325 of the third guide surface 324 is guided along the edge of the teeth surface 22. Finally, the locking groove 321 of the hook portion 320 fits along the locking shaft 330. Thereby, the movement of the tip end of the hook portion 320 is regulated by the holding portion 351, so that the circular shape can be kept. By the series of operations described above, the core members 21a to 21i are assembled into a ring shape.

Figure 16:
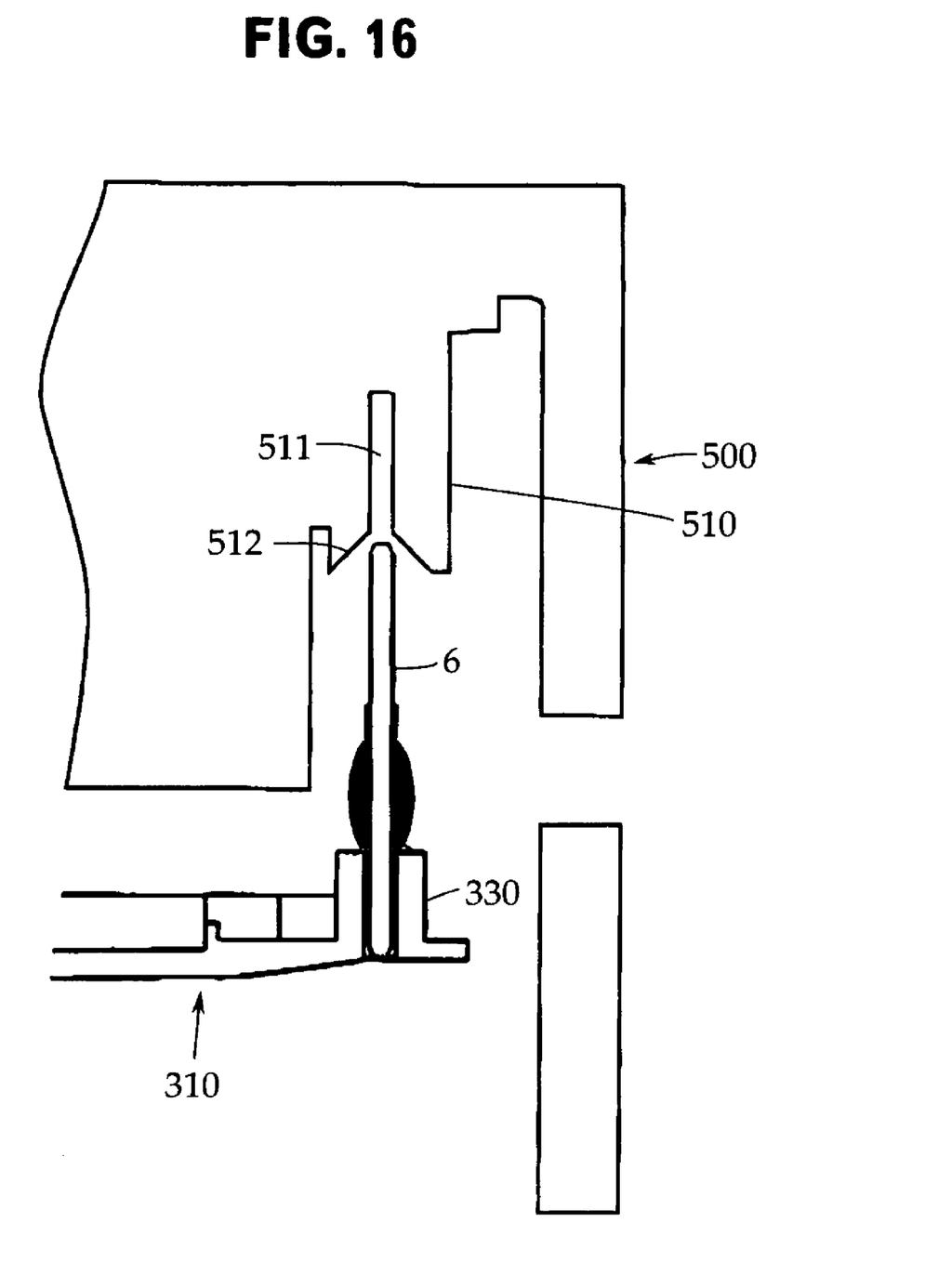
FIG. 16 is an explanatory view for illustrating a method of insert molding.

The assembled stator 2 is attached to a special-purpose insert mold 500 (refer to FIG. 16). At this time, guide pins, not shown, of the mold is caused to coincide with the guide holes 361 in the positioning portions 360 of the core members 21a to 21i, by which the relative positioning between the mold and the stator 2 can be performed. By this positioning work, not only the positioning of the stator 2 with respect to the resin compact 200 but also the relative positioning between the rotors 3 and the circuit board 5 can be performed.

Further, as shown in FIG. 16, the terminal pins 6 erected from the flange portions 310 are inserted into pin accommodating portions 510 formed on the mold 500 side. The pin accommodating portion 510 consists of a pin accommodating hole 511 in which the terminal pin 6 is inserted in the center thereof and a guide surface 512 for guiding the terminal pin 6 into the pin accommodating hole 511.

The guide surface 512 is formed into a conical shape to surely guide the terminal pin 6 into the pin accommodating hole 511. Thereby, in the case where molten resin is poured into the mold 500 and is insert molded, an umbrella-shaped convex portion 440 is formed at the peripheral edge of the terminal pin 6 as shown in FIG. 4. In the present invention, the first concave portion 228 deeper than the convex portion 440 is provided around the convex portion 440 to prevent the convex portion 440 from being exposed from the second height difference surface 225.

After the assembly in the mold has been finished, molten resin is poured into the mold, and the resin compact 200 is integrally molded. After the bearing section 240 has been attached to the stator 2 and the rotors 3 have been assembled thereto, the circuit board 5 is fixed on the second height difference surface 225 of the first storing section 220, and the insertion holes in the circuit board 5 and the terminal pins 6 are soldered to each other.

After the insulating sheet (not shown) has further been put on the circuit board 5, the lid members 10a and 10b are installed finally on both surfaces of the resin compact 200, by which the axial air-gap electric motor 1 as shown in FIG. 1 is completed.

In this embodiment, the axial air-gap electric motor 1 is of a 9-slot 8-pole type in which the stator 2 has nine slots and each of the rotors 3 has eight poles. However, the number of slots of the stator 2 and the number of poles of the rotor 3 can be changed arbitrarily according to the motor specification.

The electric motor of this embodiment has been explained by taking an axial air-gap electric motor as an example. However, the present invention can be applied to general board-incorporated mold motors, and can be applied to other modifications such as a radial gap electric motor if the modifications have the basic construction of the present invention.

The present application is based on, and claims priority from, Japanese Applications Serial Number JP2005-193033, filed Jun. 30, 2005 the disclosure of which is hereby incorporated by reference herein in its entirety.

The invention claimed is:

1. An electric motor, comprising:
    a cylindrical synthetic resin compact;
    a stator embedded in the synthetic resin compact and including a stator iron core, a winding section, a coil wound on the winding section and having a start end and a termination end, and an insulator for insulating the winding section;
    a pair of terminal pins erected on the insulator, and connected to the start end and the termination end of the coil;
    a circuit board for driving control; and
    a rotor arranged so as to face a teeth surface of the stator, wherein the synthetic resin compact includes:
    a first inner surface;
    a second inner surface positioned away from the first inner surface in an axial direction of the cylindrical synthetic resin compact and having a diameter greater than that of the first inner surface;
    a gap surface provided in a gap between the first and second inner surfaces for mounting the circuit board, the terminal pin penetrating the synthetic resin compact so that a tip portion thereof projects from the gap surface; and
    a first concave portion provided on the gap surface so as to surround the terminal pin and concaved in an axis line direction of the terminal pin.

2. The electric motor according to claim 1, wherein the second inner surface is located outside the first inner surface in the axial direction and has a second concave portion provided at a portion adjacent to the terminal pin and recessed in a radial direction of the stator.

3. The electric motor according to claim 2, wherein a width in a circumferential direction of the first concave portion is same as a width in a circumferential direction of the second concave portion.

4. The electric motor according to claim 2, wherein a width in a circumferential direction of the second concave portion is greater than a width in a circumferential direction of the first concave portion.

5. The electric motor according to claim 2, further comprising lid members provided at both ends of the synthetic resin compact, the second concave portion having a width depending on a distance between the lid member and the terminal pin.

6. The electric motor according to claim 1, wherein the synthetic resin compact further includes a convex portion integrally formed on a bottom surface of the first concave portion so as to surround the terminal pin, said convex portion having a height smaller than a depth of the first concave portion.

7. The electric motor according to claim 2, wherein the stator is further provided with an insulating sheet for covering the circuit board, the insulating sheet having a locking claw for fitting in the second concave portion.

* * * * *